United States Patent
Nagata et al.

(10) Patent No.: US 7,573,043 B2
(45) Date of Patent: Aug. 11, 2009

(54) FLAT PANEL DETECTOR

(75) Inventors: Yasushi Nagata, Kodaira (JP); Takehiko Shoji, Hachioji (JP); Masashi Kondo, Hachioji (JP); Mitsuru Sekiguchi, Nerima-ku (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/833,652

(22) Filed: Aug. 3, 2007

(65) Prior Publication Data

US 2008/0035852 A1 Feb. 14, 2008

(30) Foreign Application Priority Data

Aug. 8, 2006 (JP) .............................. 2006-215511

(51) Int. Cl.
*G01T 1/20* (2006.01)
(52) U.S. Cl. ................................................. 250/370.11
(58) Field of Classification Search ............. 250/370.11
See application file for complete search history.

(56) References Cited

U.S. PATENT DOCUMENTS

| 6,469,305 B2 * | 10/2002 | Takabayashi et al. ... | 250/361 R |
| 2005/0274916 A1 * | 12/2005 | Shoji et al. ................. | 250/580 |
| 2006/0054830 A1 * | 3/2006 | Oyaizu et al. ........... | 250/370.11 |

FOREIGN PATENT DOCUMENTS

| JP | 05-312961 A | 11/1993 |
| JP | 06-331749 A | 12/1994 |
| JP | 2000-284053 A | 10/2000 |
| JP | 2002-116258 | 4/2002 |
| JP | 2002286896 A * | 10/2002 |
| JP | 2005-308582 A | 11/2005 |
| JP | 2006125932 A * | 5/2006 |

* cited by examiner

*Primary Examiner*—Constantine Hannaher
(74) *Attorney, Agent, or Firm*—Finnegan, Henderson, Farabow, Garrett & Dunner, L.L.P.

(57) ABSTRACT

A radiation flat panel detector is created in which degradation of a phosphor layer property during aging is inhibited, the phosphor layer is protected from chemical alteration and physical impact, and sharpness is excellent. A flat panel detector possessing a light-receiving element and provided thereon, a scintillator panel possessing a scintillator sheet having a phosphor layer provided on a substrate and provided thereon, a first protective film placed on the phosphor layer side and a second protective film placed on the substrate side to seal the scintillator sheet, wherein the light-receiving element is provided on the first protective film side of the scintillator panel; the scintillator sheet is sealed at 5-8000 Pa; and the phosphor layer brought into contact with the first protective film and the light-receiving element plane brought into contact with the first protective film both have a surface roughness Ra of 0.05-0.8 μm.

6 Claims, 3 Drawing Sheets

Conventional Design

FIG. 4

FLAT PANEL DETECTOR

This application claims priority from Japanese Patent Application No. 2006-215511 filed on Aug. 8, 2006, which is incorporated hereinto by reference.

TECHNICAL FIELD

The present invention relates to a flat panel detector having a flexible scintillator panel.

BACKGROUND

Generally, radiographic images such as X-ray images have been commonly utilized for diagnoses of condition of a patient at medical scenes. In particular, radiographic images by an intensifying screen-film system, as a result of achievement of a high sensitivity and a high image quality during the long improvement history, are still utilized at medial scenes all over the world as an image pick-up system provided with the both of high reliability and superior cost performance. However, the image information is so-called analogue image information, and it is not possible to perform free image processing and electronic transmission in a moment as with digital image information which has been ever developing in recent years.

Therefore, in recent years, a radiographic image detector system such as computed radiography (CR) and flat-panel type radiation detector (FPD) has come to be in practical use. Since these can directly obtain a digital radiographic image and directly display the image on an image display device such as a cathode ray tube and a liquid crystal panel, there is not necessarily required image formation on photographic film. As a result, these digital X-ray image detector systems have decreased necessity of image formation by silver salt photography and significantly improved convenience of diagnostic works at hospitals and clinics.

Computed radiography (CR) has come to be in practical use in medical scenes at present as one of digital technologies of X-ray images. However, the sharpness is not sufficient nor the spatial resolution is, and CR has not achieved an image quality of a screen-film system. In addition, flat plate X-ray detector system (FPD) employing thin film transistor (TFT), described in such as "Amorphous Semiconductor Usher in Digital X-ray Imaging" by John Rowlands, Physics Today, 1997 November, p. 24, and "Development of a High Resolution, Active Matrix, Flat-Panel Imager with Enhanced Fill Factor" by L. E. Antonuk, SPIE, 1997, vol. 32, p. 2, as a further new digital X-ray image technology has been developed.

Utilized is a scintillator plate, which is prepared by employing an X-ray phosphor provided with a property of emitting via radiation to convert radiation into visible light, and it is necessary to utilize a scintillator plate having a high emission efficiency to improve an SN ratio in image pick-up at a low dose. Generally, the emission efficiency of a scintillator plate is determined by a thickness of a phosphor layer and an X-ray absorption coefficient of a phosphor, however, the thicker the phosphor layer thickness is, the more sharpness is decreased due to scattering of emission light in a phosphor layer. Thus, sharpness desired for an image, which is determined, depends on the thickness.

Since cesium iodide (CsI) particularly had a relatively high conversion ratio from X-ray to visible light and the phosphor can be formed into a columnar crystal structure via vacuum evaporation, scattering of luminescent light in the crystal via an optical guide effect was suppressed, whereby the phosphor layer thickness was possible to be made thicker. However, since an emission efficiency is low with CsI only, as described in Japanese Patent Examined Publication No. 54-35060, an admixture of CsI and sodium iodine (NaI) at a given molar ratio is deposited on a substrate via evaporation as sodium-activated cesium iodide (CsI:Na), or an admixture of CsI and thallium iodine (TlI) at a given molar ratio is recently deposited on a substrate via evaporation as thallium-activated cesium iodide (CsI:Tl), and an annealing treatment is subsequently conducted as a post-process to improve visible region conversion efficiency, and to be used as an X-ray phosphor.

However, there is a problem such that an aging characteristic is deteriorated since a CsI-based scintillator (phosphor layer) exhibits a deliquescent property. In order to prevent such the aging deterioration, it has been proposed that a moisture-resistant protective film is formed on the CsI-based scintillator (phosphor layer) surface. For example, it is known that the upper portion and the side of a scintillator layer (corresponding to a phosphor layer of the present invention), and the outer circumferential portion of the scintillator layer provided on a substrate are covered with polyparaxylene (refer to Patent Document 1, for example). But, since the polyparaxylene resin described in Patent Document 1 exhibits a weak moisture resistance property, the phosphor layer can not be sufficiently protected, and the polyparaxylene resin is penetrated into the spacing of columnar crystals constituting the scintillator layer, whereby there is produced a drawback such that an optical guide effect is blocked.

As to a transparent resin film having a moisture permeability of less than $1.2 \text{ g/m}^2 \cdot \text{day}$, it is known that at least a scintillator layer surface which is not facing a support, and the scintillator layer side are covered (refer to Patent Document 2, for example).

Though the method described in Patent Document 2 is possible to acquire high moisture resistance when a transparent organic polymer film such as polypropylene or polyethylene terephthalate is provided as a protective film via adhesion onto a phosphor layer, it can not be substantially employed as the protective film since there is produced fatal drawback such that sharpness drops, a film thickness of at most 5 μm is required in order to avoid the above-described, and it becomes insufficient to protect the phosphor layer from chemical alteration and physical impact. Though there are methods described in Japanese Patent O.P.I. Publication Nos. 5-312961 and 6-331749 in the case of providing a scintillator panel on the light-receiving element plane, these exhibit low productivity, and degradation of sharpness on the scintillator panel and the light-receiving element plane can not be avoided. An example to use a flexible protective film made of polyparaxylene is described in Japanese Patent O.P.I. Publication No. 2002-116258, but sharpness is degraded because of the after-mentioned reason concerning propagation of luminescent light from the scintillator within the protective film, since the protective film is closely attached to the light-receiving plane when a flexible organic film is used as a protective film.

Further, it is commonly known that a phosphor layer is formed on a rigid substrate made of aluminum or amorphous carbon via vacuum evaporation as a method of manufacturing a scintillator, and the entire surface of the scintillator is covered thereon with a protective film (Japanese Patent No. 3566926).

However, when a phosphor layer is formed on such the substrate which is not freely bendable, there appears a problem such that an even image quality property can not be obtained within the light-receiving element plane of a flat panel detector because of influence from deformation and warpage of a substrate during evaporation, in the case of attaching a scintillator panel to a light-receiving plane. This problem has become more serious while the flat panel detector is growing in size.

In order to avoid this problem, a method of forming a scintillator directly on an imaging element via evaporation is commonly utilized, and a medical intensifying screen exhibiting not much sharpness but flexibility is also utilized as an alternative to the scintillator.

In this situation, it is desired to develop a radiation flat panel detector in which productivity is excellent, degradation of a phosphor layer property during aging is inhibited, the phosphor layer is protected from chemical alteration and physical impact, and sharpness between a scintillator panel and a light-receiving element plane is hardly degraded.

(Patent Document 1) Japanese Patent O.P.I. Publication No. 2000-284053.

(Patent Document 2) Japanese Patent O.P.I. Publication No. 2005-308582.

SUMMARY

The present invention was made on the basis of the above-described situation. It is an object of the present invention to provide a radiation flat panel detector in which degradation of a phosphor layer property during aging is inhibited, the phosphor layer is protected from chemical alteration and physical impact, and sharpness is excellent.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DESCRIPTION OF THE PREFERRED EMBODIMENTS

The above object of the present invention is accomplished by the following structures.

(Structure 1) A flat panel detector comprising a light-receiving element and provided thereon, a scintillator panel comprising a scintillator sheet having a phosphor layer provided on a substrate and provided thereon, a first protective film placed on the phosphor layer side and a second protective film placed on the substrate side to seal the scintillator sheet, wherein the light-receiving element is provided on the first protective film side of the scintillator panel; and the scintillator sheet is sealed at 5-8000 Pa.

(Structure 2) The flat panel detector of Structure 1, wherein a surface of the first protective film brought into partial contact with the phosphor layer has a surface roughness Ra of 0.05-0.8 µm, and another surface of the first protective film brought into partial contact with a light receiving element plane has a surface roughness Ra of 0.05-0.8 µm.

(Structure 3) The flat panel detector of Structure 1 or 2, wherein the first protective film and the second protective film have a thickness of 12-200 µm.

(Structure 4) The flat panel detector of any one of Structures 1-3, wherein the substrate has a thickness of 50-500 µm, and is formed from a polymer film exhibiting flexibility.

(Structure 5) The flat panel detector of Structure 4, wherein the polymer film is a polyimide (PI) film or a polyethylene naphthalate (PEN) film.

(Structure 6) The flat panel detector of any one of Structures 1-5, wherein the scintillator panel has a total thickness of at most 1 mm.

(Structure 7) The flat panel detector of any one of Structures 1-6, wherein the phosphor layer is a cesium iodide (CsI) layer.

After considerable effort during intensive studies in order to solve the above-described problems, the following matters have been found out by the inventors. When a polymer film such as polypropylene or ethylene terephthalate is provided as a protective film, and closely attached onto a phosphor layer, sharpness is degraded since light at an angle exceeding critical angle θ of the light entering into the inside of a protective film is totally reflected at the interface between a protective film and an air space layer while luminescent light generated in the phosphor layer passes through the protective film, and reflected light is propagated far, as a cause of not having high sharpness but exhibiting high moisture resistance. The thicker the protective film, the farther this reflected light is propagated, and presumably, sharpness is further degraded.

On the other hand, in order to inhibit the total reflection at the interface between the protective film and the air space layer, the incident light is emitted outside with no reflection again at the interface between the first protective film and the air space layer by producing no presence of critical angle θ, when luminescent light generated in the phosphor layer enters the protective film.

When a protective film is closely attached to a light-receiving element, sharpness is presumably degraded since luminescent light of a scintillator scattered at the interface is propagated in the protective film, and reenters a pixel situated nearby. On the other hand, it has been found out in the present invention that when an air space layer is present between the protective film and the light-receiving element, luminescent light scattered on the light-receiving element surface is not totally reflected because of the relationship between refractive indices of the air space layer and the protective film, returns on the scintillator side, and does not reenter the pixel situated nearby.

The situation of no substantial adhesion in the present invention means a situation where the phosphor surface and a moisture resistant protective film are to be hardly continuous to each other optically as well as mechanically, even though the phosphor surface is in point-contact with the moisture resistant protective film.

Further, with respect to an even image quality property which can not be obtained within the light-receiving element plane of a flat panel detector because of influence from deformation and warpage of a substrate during evaporation, in the case of attaching a scintillator panel to a light-receiving plane, it has been found out in the present invention that the scintillator panel is deformed in the form suitable for the light-receiving plane profile, whereby sharpness can be obtained evenly on the entire light-receiving plane of a flat panel detector.

While the preferred embodiments of the present invention have been described using specific terms, such description is for illustrative purposes only, and it is to be understood that changes and variations may be made without departing from the spirit or scope of the appended claims.

DETAILED DESCRIPTION OF THE INVENTION

Embodiments of the present invention will be described referring to FIG. 1(a), FIG. 1(b), FIG. 1(c), FIG. 2(a), FIG. 2(b), FIG. 3(a), FIG. 3(b) and FIG. 4, but the present invention is not limited thereto.

Figure 1A:
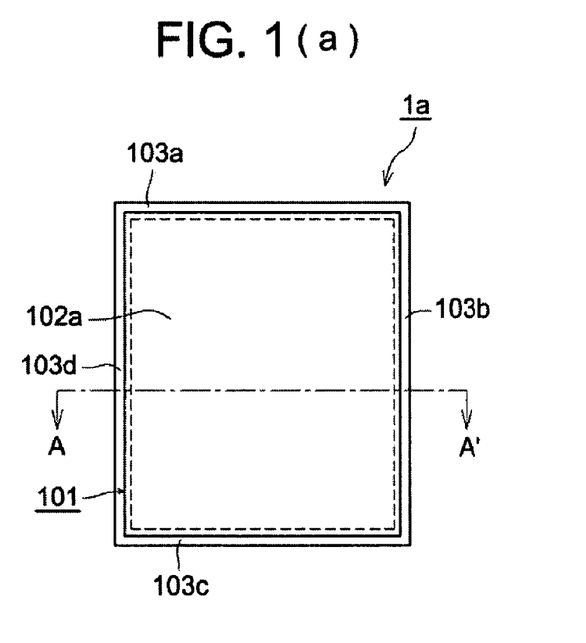
FIG. 1(a) shows a schematic plan view of a scintillator panel sealed on four sides by a protective film.
Figure 1B:
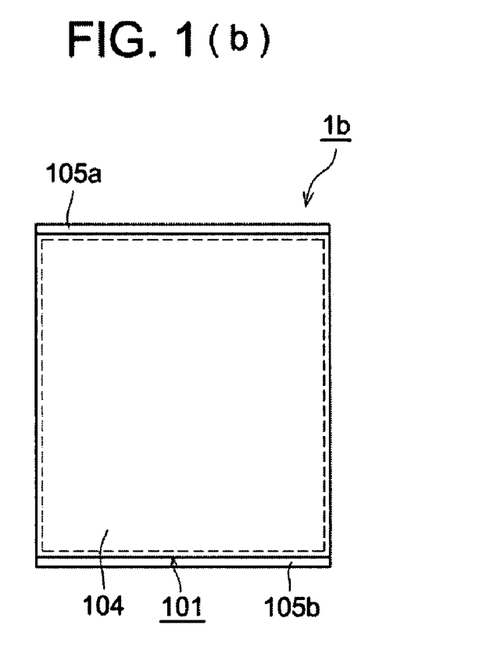
FIG. 1(b) shows a schematic plan view of a scintillator panel sealed on two sides by a protective film.
Figure 1C:
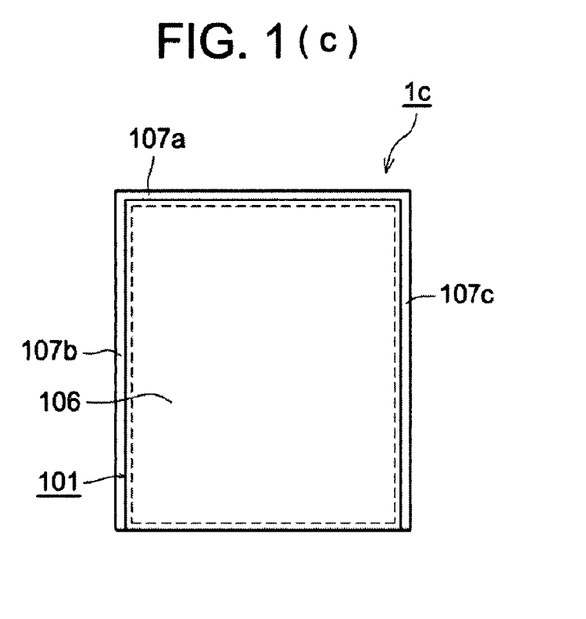
FIG. 1(c) shows a schematic plan view of a scintillator panel sealed on three sides by a protective film.

Each of FIG. 1(a), FIG. 1(b) and FIG. 1(c) shows a schematic plan view of a scintillator panel. FIG. 1(a) shows a schematic plan view of a scintillator panel sealed on four sides by a protective film. FIG. 1(b) shows a schematic plan view of a scintillator panel sealed on two sides by a protective film. FIG. 1(c) shows a schematic plan view of a scintillator panel sealed on three sides by a protective film.

The scintillator panel in FIG. 1(a) will be explained. In FIG. 1(a), 1a represents a scintillator panel. Scintillator panel 1a comprises first protective film 102a provided on the side of phosphor layer 101b (refer to the after-mentioned FIG. 2(a)) of scintillator sheet 101, and second protective film 102b (refer to FIG. 2(a)) provided on the side of substrate 101a of scintillator sheet 101. Symbols 103a, 103b, 103c and 103d represent portions sealed on four sides by first protective film 102a as well as second protective film 102b (refer to FIG. 2(a)). Any of sealed portions 103a, 103b, 103c and 103d is formed beyond a peripheral portion (dotted line portion) of scintillator sheet 101. Sealing on four sides means a situation where sealed portions on four sides are present. FIG. 1(a) shows an embodiment of sealing on four sides in which a scintillator sheet is provided between two sheets of first protective film 102a and second protective film 102b (refer to FIG. 2(a)), and is sealed on four sides. In this case, first protective film 102a and second protective film 102b may be similar or different, and can be selected appropriately, if desired.

The scintillator panel in FIG. 1(b) will be explained. In FIG. 1(b), 1b represents a scintillator panel. Scintillator panel 1b comprises first protective film 104 provided on the side of phosphor layer 101b (refer to FIG. 2(a)) of scintillator sheet 101, and the second protective film {not shown in FIG. 1(b)} provided on the side of substrate 101a of scintillator sheet 101. Symbols 105a and 105b represent portions sealed on two sides by first protective film 104 as well as the second protective film {not shown in FIG. 1(b)} provided on the substrate side. Any of sealed portions 105a and 105b is formed beyond a peripheral portion (dotted line portion) of scintillator sheet 101. Sealing on two sides means a situation where sealed portions on two sides are present. FIG. 1(b) shows an embodiment of sealing on two sides in which a scintillator sheet is provided between protective films prepared in the tubular form, and is sealed on two sides. In this case, the same protective film is used for first protective film 104 and the second protective film {not shown in FIG. 1(b)}.

The scintillator panel in FIG. 1(c) will be explained. In FIG. 1(c), 1c represents a scintillator panel. Scintillator panel 1c comprises first protective film 106 provided on the side of phosphor layer 101b (refer to FIG. 2(a)) of scintillator sheet 101, and the second protective film {not shown in FIG. 1(c)} provided on the side of substrate 101a of scintillator sheet 101. Symbols 107a, 107b and 107c represent portions sealed on three sides by first protective film 106 as well as the second protective film {not shown in FIG. 1(b)} provided on the substrate side. Any of sealed portions 107a, 107b and 107c is formed beyond a peripheral portion (dotted line portion) of scintillator sheet 101. Sealing on three sides means a situation where sealed portions on three sides are present. FIG. 1(c) shows an embodiment of sealing on three sides in which a scintillator sheet is provided between two protective films formed by folding a protective film in two at the center, and is sealed on three sides. In this case, the same protective film is used for first protective film 106 and the second protective film {not shown in FIG. 1(c)}. As shown in FIG. 1(a), FIG. 1(b) and FIG. 1(c), moisture penetration is possible to be inhibited since sealed portions of two protective films (the first protective film and the second protective film) are formed beyond the peripheral portion of the scintillator sheet. The phosphor layer of the scintillator sheet as shown in FIG. 1(a), FIG. 1(b) and FIG. 1(c) is preferably formed on a substrate via the after-mentioned vapor deposition method. An evaporation method, a sputtering method, a CVD method or an ion plating method is possible to be employed as a vapor deposition method.

Scintillator panels shown in FIG. 1(a), FIG. 1(b) and FIG. 1(c) can be appropriately selected, depending on kinds of phosphor and manufacturing apparatuses.

Figure 2:
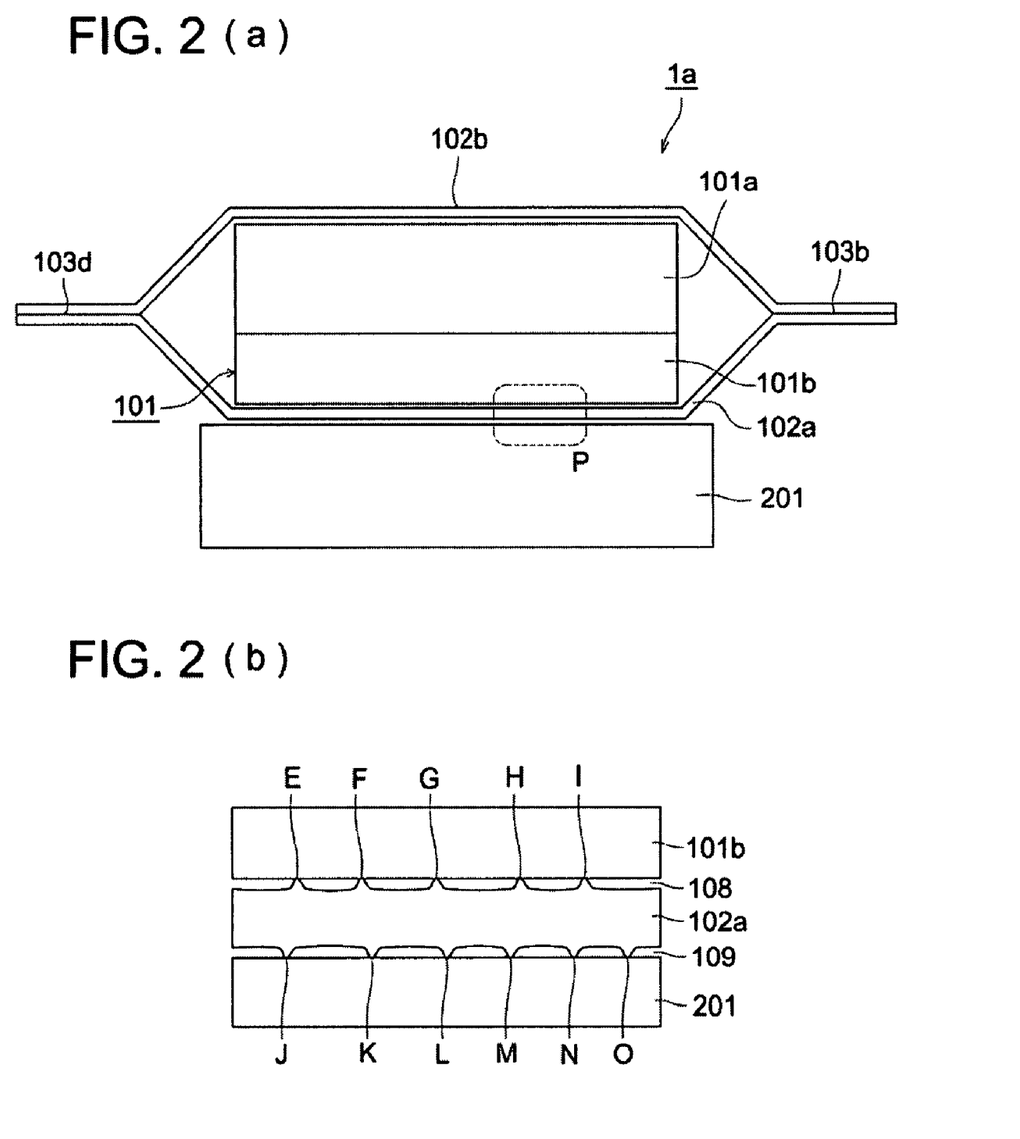
FIG. 2(a) shows a schematic cross-sectional view in the case of being cut along with A-A' of FIG. 1(a)
FIG. 2(b) is a schematic enlarged illustration of a portion designated as P of FIG. 2(a)

FIG. 2(a) shows a schematic cross-sectional view in the case of being cut along with A-A' of FIG. 1(a). This is brought into contact with a light-receiving element. FIG. 2(b) is a schematic enlarged illustration of a portion designated as P of FIG. 2(a).

Scintillator sheet 101 comprises substrate 101a and provided thereon, phosphor layer 101b. Symbol 102b represents the second protective film provided on the side of substrate 101a of scintillator sheet 101. Symbol 108 represents void portion (air space layer) formed between contact point portions of E-I, which are partial contact portions between first protective film 102a and phosphor layer 101b. Void portion 108 is an air space layer, and in the relationship between refractive index of void portion (air space layer) 108 and refractive index of first protective film 102a, the refractive index of first protective film 102a is much greater than the refractive index of void portion (air space layer) 108.

Symbol 109 represents void portion (air space layer) formed between contact point portions of J-O, which are partial contact portions between first protective film 102a and light-receiving element 201. Void portion 109 is an air space layer, and in the relationship between refractive index of void portion (air space layer) 109 and refractive index of first protective film 102a, the refractive index of first protective film 102a is much greater than the refractive index of void portion (air space layer) 109.

In addition, the relationship between refractive index of void portion 108 or 109, and refractive index of first protective film 102a in the case of scintillator panels shown in FIG. 1(b) and FIG. 1(c) is the same as that in the case of FIG. 2(a).

First protective film 102a provided on the side of phosphor layer 101b is not attached entirely to phosphor, layer 101b, resulting in partially contacting at contact point portions of E-I. The entire surface on the side of phosphor layer 101b is sealed at 5-8000 Pa or preferably at 10-6000 Pa, and covered by first protective film 102a provided on the side of phosphor layer 101b. In the present invention, this situation means a situation in which no first protective film provided on the phosphor side is substantially attached. The pressure applied during sealing in the case of scintillator panels shown in FIG. 1(b) and FIG. 1(c) is the same as that in the case of FIG. 2(a).

First protective film 102a is not attached entirely to light-receiving element 201, resulting in partially contacting at contact point portions of J-O.

As shown in FIG. 2(a), as to scintillator panel 1a, the entire surface of substrate 101a and phosphor layer 101b is covered by first protective film 102a provided on phosphor 101b side and second protective film 102b provided on substrate 101a side, but is not substantially attached to first protective film 102a, and each of four end portions of first protective film 102a and second protective film 102b is sealed.

The following method can be provided as a method of covering the entire surface, but being not substantially attached to first protective film 102a.

A scintillator sheet is sealed by the first protective film and the second protective film under reduced pressure of 5-8000 Pa, and preferably 10-6000 Pa. In this case, contact portions between the protective film and the phosphor layer increase when sealing with high vacuum, and contact point portions decrease when sealing reversely with low vacuum. Further, in the case of a pressure exceeding 8000 Pa, wrinkles are easy to be generated on the protective film surface, resulting in no availability of practical use.

Surface roughness of the first protective film brought into contact with a phosphor layer is set to an Ra of 0.05-0.8 μm in view of adhesion to the first protective film, sharpness, adhesion to light-receiving element and so forth. The surface profile of the first protective film is possible to be easily adjusted by making a selection of usable resin films, or coating an inorganic material-containing layer on a resin film. In addition, surface roughness Ra is measured by Surfcom 1400D manufactured by Tokyo Seimitsu Co., Ltd.

The entire surface of phosphor layer 101b is possible to be covered with no substantial adhesion by using the above-described (1) or (2) singly, or using (1) and (2) in combination.

The following method can be provided as a method in which first protective film 102a is not substantially attached to light-receiving element 201.

<1> There is a method in which the light-receiving element is placed on scintillator panel 1a, and subsequently an appropriate pressure is applied thereon from the second protective film side through elasticity of a foam material such as a sponge and the like. A situation where first protective film 102a is not substantially attached to light-receiving element 201 can be made via the above-described <1>.

The protective film preferably has a thickness of 12-200 μm in view of a formation property of a void portion, a protection property of a phosphor layer, sharpness, moisture resistance, workability and so forth, and more preferably has a thickness of 20-40 μm. The average thickness is determined from the thicknesses measured at 10 portions employing a stylus type thickness tester (PG-01, manufactured by Teclock Co., Ltd.).

The haze ratio is preferably 3-40% in view of sharpness, radiation image unevenness, production stability, workability and so forth, and more preferably 3-10%. The haze ratio is measured employing NDH 5000W, manufactured by Nippon Denshoku Industries Co., Ltd.

The protective film preferably has an optical transmittance of at least 70% at a wavelength of 550 nm in view of a photoelectric conversion efficiency, a scintillator emission wavelength and so forth, and more preferably has an optical transmittance of 70-99% from a practical standpoint, since a film having an optical transmittance of at least 99% is difficult to be industrially acquired. The optical transmittance was measured employing a spectrophotometer (U-1800, manufactured by Hitachi High-Technologies Corporation).

The protective film preferably has a moisture permeability of at most 50 $g/m^2 \cdot day$ (40° C. and 90% RH), and more preferably has a moisture permeability of at most 100 $g/m^2 \cdot day$ (40° C. and 90% RH). The moisture permeability was measured in accordance with JIS Z0208.

As shown in FIG. 2(a), a method of sealing scintillator sheet 101 between first protective film 102a and second protective film 102b may be any commonly known method, but a contacting innermost layer between first protective film 102a and second protective film 102b is preferably to be a resin film exhibiting a thermal fusion property in order to conduct a sealing treatment effectively via a heat-melt process, employing an impulse sealer.

Figures 3A, 3B:
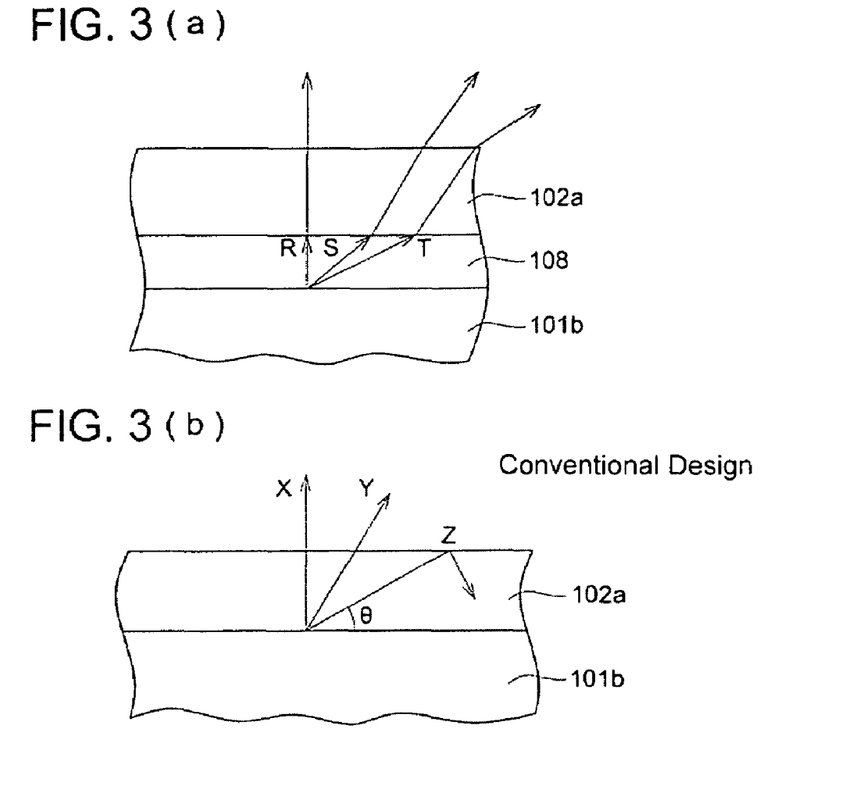
FIG. 3(a) is a schematic diagram showing the condition of refraction of light at void portion 108 as shown in FIG. 2(b)
FIG. 3(b) is a schematic diagram showing the condition of refraction of light in the situation where a conventional protective film is closely attached to a phosphor layer.

FIG. 3(a) and FIG. 3(b) are schematic diagrams showing the condition of refraction of light at void portion 108 as shown in FIG. 2(a) and FIG. 2(b), and the condition of refraction of light in the situation where a conventional protective film is closely attached to a phosphor layer. FIG. 3(a) is a schematic diagram showing the condition of refraction of light at void portion 108 as shown in FIG. 2(b). FIG. 3(b) is a schematic diagram showing the condition of refraction of light in the situation where a conventional protective film is closely attached to a phosphor layer.

The case of FIG. 3(a) will be explained.

In the case of FIG. 3(a), since void portion (air space layer) 108 is present between a protective film and a phosphor layer, refractive index of the protective film is much larger than refractive index of the void portion (air space layer) in the relationship between refractive index of first protective film 102a and refractive index of void portion (air space layer) 108. Thus, light R, S or T emitted on the phosphor layer surface enters the inside of the protective film with no reflection at the interface between first protective film 102a and void portion (air space layer) 108 (situation with no critical angle), and the incident light is emitted outside with no reflection again at the interface between the first protective film and the void portion (air space layer) because of an optically symmetric structure having air space layer (low refractive index layer)/protective film/air space layer, whereby degradation of sharpness is possible to be inhibited.

The case of FIG. 3(b) will be explained.

In the case of FIG. 3(b), since protective film 102a is closely attached to phosphor layer 101b, light Z at an angle exceeding critical angle θ among light X, light Y and light Z emitted on the phosphor surface has a larger ratio of total reflection at the interface because of an optically asymmetric structure having protective film/air space layer, whereby sharpness is degraded as one of the causes.

In the present invention, when a scintillator sheet is sealed between the first protective film and the second protective film, a method of manufacturing a scintillator panel exhibiting no degradation of sharpness has become possible by realizing, as shown in FIG. 3(a), not only that the phosphor layer is not substantially attached to the first protective film, but also that the protective film is not substantially attached to the light-receiving element plane.

Further, it was found out in the present invention that a scintillator panel was deformed so as to be suitable for a light-receiving element plane profile by producing a substrate formed from a polymer film having a thickness of 50-500 μm, and producing a scintillator panel having the total thickness of at most 1 mm, whereby sharpness can be evenly obtained on the entire light-receiving plane.

In the present invention, any film is usable as a polymer film for a substrate during evaporation, provided that the film has a thickness of 50-500 μm, and exhibits flexibility, but polyimide (PI) or polyethylene naphthalate (PEN) is preferable in view of heat resistance during evaporation.

In the present invention, as shown in FIG. 1(a), FIG. 1(b), FIG. 1(c), FIG. 2(a), FIG. 2(b), FIG. 3(a) and FIG. 3(b), the first protective film is not substantially attached to a phosphor layer covered by the first protective film when sealing a scintillator sheet between the first protective film and the second protective film (contact point portions are provided between the first protective film and the phosphor layer, and void portions (air space layers) are provided between contact point portions), whereby the following effects have been produced.

[1] A polypropylene film, a polyethylene terephthalate film and a polyethylene naphthalate film exhibiting lowered sharpness caused by large refraction index despite the fact that these films exhibited an excellent strength property as the protective film, which were difficult to be used, turned out to be easy to be utilized, whereby preparation of a high-quality scintillator panel in which performance degradation is inhibited for a long duration became possible.

[2] A scintillator panel exhibiting excellent durability was possible to be realized, since the protective film exhibiting high scratch resistance was possible to be used with no degradation of images.

[3] A protective film exhibiting excellent durability was possible to be realized with no prevention of a light guide effect generated in phosphor crystals.

Figure 4:
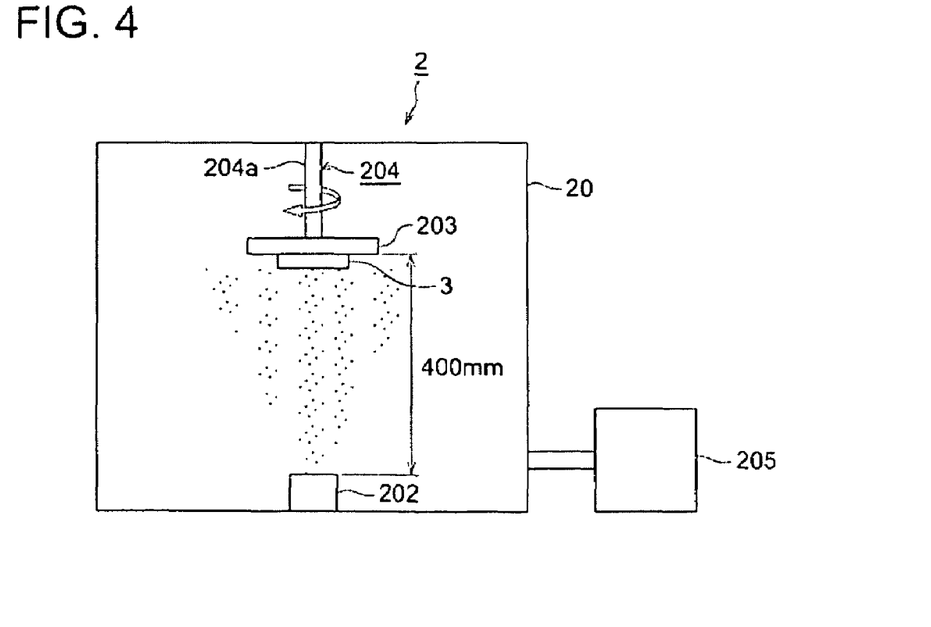
FIG. 4 is a schematic diagram of an evaporator by which a phosphor layer is formed on a substrate via a vapor deposition method.

FIG. 4 is a schematic diagram of an evaporator by which a phosphor layer is formed on a substrate via a vapor deposition method.

In FIG. 4, numeral 2 represents an evaporator. Evaporator 2 is equipped with vacuum chamber 20, vacuum source 202 provided in vacuum chamber 20 from which vapor is deposited onto substrate 3, substrate holder 203 holding substrate 3, substrate rotation mechanism 204 in which vapor is deposited onto a substrate from evaporation source 202 while rotating substrate holder 203, facing evaporation source 203, vacuum pump 205 for evacuation of vacuum chamber 20 and introduction of air.

Evaporation source 202 may be composed of aluminum crucible wound with a heater to heat a phosphor layer-forming material introduced in the crucible via a resistance-heating method, or may be composed of a boat with a heater made of a high melting point metal. A method of heating a phosphor layer-forming material may also be one utilizing heating via electron beam, high-frequency induction and so forth other than resistance heating, but, in the resent invention, resistance heating method which can be applied for a large number of materials is preferable in view of easy handling with a simple mechanism and low cost. Further, evaporation source 202 may be a molecular beam source employed via a molecular beam epitaxial method.

Substrate rotation mechanism 204 holding substrate holder 203 is fitted with, for example, rotation axis 204a to rotate substrate holder 203, a motor (not shown in FIG. 4) as a drive source of rotation axis 204a, placed in the exterior of vacuum chamber 20, and so forth.

Substrate holder 203 is preferably fitted with a heater (not shown in FIG. 4) to heat substrate 3. By heating substrate 3, surface adsobate of substrate 3 can be released and removed, generation of impurity layer formed between the surface of substrate 3 and the phosphor layer-forming material can be inhibited, and phosphor layer quality together with enhanced adhesion can also be adjusted.

Further, a shutter (not shown in FIG. 4) may be placed between substrate 3 and evaporation source 202 to cut off somewhere in the space between them. The shutter can prevent a material other than an objective substance, which has adhered to the phosphor layer-forming material surface from depositing onto substrate 3 at an initial evaporation stage.

In order to form a phosphor layer onto substrate 3 employing foregoing evaporator 2, substrate 3 is first fitted onto substrate holder 203. Next, the inside of vacuum chamber 20 is evacuated. Then, after substrate holder 203 is rotated facing evaporation source 203 by substrate rotation mechanism 204, and vacuum chamber 201 has reached an evaporatable vacuum degree, the phosphor layer-forming material is evaporated from evaporation source 202 via heating to grow a phosphor to a desired thickness onto the surface of substrate 3. In this case, substrate 3 and evaporation source 202 are preferably placed at an distance of 100-1500 mm. Incidentally, a phosphor layer-forming material employed as an evaporation source may be processed in the form of tablet via pressure-compression, or in the form of powder. Further, in place of a phosphor layer-forming material, raw material thereof or an admixture of raw material may be employed.

Web-processable sheets are preferable as the flexible sheets used for a support. In view of this, preferable are plastic films such as a celluose acetate film, a polyester film, a polyethylene terephthalate film, a polyethylene naphthalate film, a polyamide film, a polyimide film, a triacetate film, polycarbonate film and so forth. These substrates may have a smooth surface, and may also have a matte surface to improve adhesion to a phosphor layer. Further, a subbing layer may be provided on the phosphor layer surface to improve adhesion to the phosphor layer.

Further, the substrate preferably has a thickness of 50-500 μm in view of flexibility, and more preferably has a thickness of 75-250 μm. The thickness was measured employing a stylus type thickness tester (PG-01, manufactured by Teclock Co., Ltd.).

Cesium iodide (CsI) is employed as a material to form a phosphor layer since cesium iodide particularly had a relatively high conversion ratio from X-ray to visible light and the phosphor can be formed into a columnar crystal structure via vacuum evaporation, scattering of luminescence in the crystal via an optical guide effect was suppressed, whereby the phosphor layer thickness was possible to be made thicker, provided that various activators are added since an emission efficiency is low with CsI only. For example, an admixture of CsI and sodium iodine (NaI) at a given molar ratio can be provided as described in Japanese Patent Examined Publication No. 54-35060.

Recently, a method of forming CsI via evaporation, and a X-ray phosphor production method to form activators such as indium (In), thallium (Tl), lithium (Li), potassium (K), rubidium (Rb), sodium (Na) and so forth via sputtering are disclosed, for example, as described in Japanese Patent O.P.I. Publication No. 2001-59899.

Next, the protective film employed in the present invention will be described.

As a structure example of the protective film employed in the present invention, provided is a multilayered lamination material having a structure of protective film (outermost layer)/intermediate layer (moisture-resistant layer)/innermost layer (heat-melt layer). Each layer can also be a multilayer, if desired.

As a thermoplastic resin film used for the innermost layer (heat-melt layer), preferred are an EVA film, a PP film, an LDPE film, an LLDPE film, and an LDPE film and an LLDPE film produced by using a metallocene catalyst, or a film obtained by mixing each of these films and an HDPE film.

Intermediate Layer (Moisture-Resistant Layer)

As an intermediate layer (moisture-resistant layer), provided is the layer comprising an inorganic film described in Japanese Patent O.P.I. Publication No. 6-95302 and "Shinku Handbook extra edition" (p 132-134) edited by ULVAC, Inc. As the inorganic film, a metal-evaporated film and an inorganic oxide-evaporated film are provided.

Examples of the metal-evaporated film include ZnN, SiC, TiC, $Si_3N_4$, single-crystal Si, ZrN, PSG, amorphous Si, W, Al and so forth. Of these, aluminum is preferable as the metal-evaporated film.

As the inorganic evaporated films, there may be evaporated inorganic films described in "Hakumaku Handbook (Thin Film Handbook)" pages 879-901 (Japan Society for the Promotion of Science), "Shinku Gijutsu Handbook (Vacuum Technology Handbook)" pages 502-509, 612, 810 (Nikkan Kogyo Shimbun, Ltd.), "Shinku Handbook Zoteiban (Vacuum Handbook extra edition)" pages 132-134 (edited by ULVAC Inc.). Examples of evaporated inorganic films include $Cr_2O_3$, $Si_xO_y$ (x=1, y=1.5-2.0), $Ta_2O_3$, ZrN, SiC, TiC, PSG, $Si_3N_4$, single-crystal Si, amorphous Si, W, $Al_2O_3$ and so forth.

As a thermoplastic resin film used as a base material for an intermediate layer (moisture-resistant layer), there may be materials used for general packaging films, such as ethylene-tetrafluoroethyl copolymer (ETFE), high-density polyethylene (HDPE), stretched polypropylene (OPP), polystyrene (PS), polymethyl methacrylate (PMMA), biaxially stretched nylon 6, polyethylene terephthalate (PET), polycarbonate (PC), polyimide, and polyether styrene (PES).

As the method of preparing the evaporated film, there may be common methods as described in "Shinku Gijutsu Handbook oyobi Hoso Gijutsu (Vacuum Technology Handbook and Packaging Technology) Vol. 29, No. 8, for example, such as a resistance heating method or a high-frequency induction heating method, an electron beam (EB) method, a plasma (PCVD) and so forth. The evaporated film preferably has a thickness of 40-200 nm, and more preferably has a thickness of 50-180 nm.

Protective Film (Outermost Layer)

Polymeric films are used as the thermoplastic resin film used through the evaporated film sheet for general packaging materials (for example, functional packaging materials newly developed by Toray Research Center Inc.), and examples thereof include low-density polyethylene (LDPE), high-density polyethylene (HDPE), linear low-density polyethylene (LLDPE), medium-density polyethylene, non-stretched polypropylene (CPP), OPP, stretched nylon (ONy), PET, cellophane, polyvinyl alcohol (PVA), stretched vinylon (OV), ethylene-vinyl acetate copolymer (EVOH), vinylidene chloride (PVDC), fluorine-containing olefin (fluoroolefin) polymer or fluorine-containing olefin copolymer, and so forth.

Also as the thermoplastic films, there may be naturally used, if desired, a multilayer film formed via coextrusion with foreign films or a multi layer film formed via lamination with a varied stretching angle. Further, in order to obtain physical characteristics of desired packing materials, it is naturally possible to form them in combination with the densities and molecular weight distributions. For the thermoplastic film as the innermost layer, used are LDPE, LLDPE, and LDPE and LLDPE produced by employing a metallocene catalyst. Further employed are films for which a mixture of these films and HDPE films is used.

In the case of no use of the inorganic evaporated layer, a protective film is desired to have a function as an intermediate layer. In this case, a single film or at least two laminated films among thermoplastic films used as the protective film may be utilized, if desired. For example, CPP/OPP, PET/OPP/LDPE, Ny/OPP/LDPE, CPP/OPP/EVOH, saran UB/LLDPE (where saran UB represents a biaxially stretched film made from a vinylidene chloride ethyl-acrylate ester based copolymer resin, produced by Asahi Kasei Corporation), K-OP/PP, K-PET/LLDPE, K-Ny/EVA (where K represents a film coated with vinylidene chloride resin), and so forth.

Various types of commonly known methods are utilized as the method of producing these protective films. Usable examples thereof include a wet lamination method, a dry lamination method, a hot melt lamination method, an extrusion lamination method, and a thermal lamination method. A similar method can be naturally utilized in the case of using no film evaporated with an organic material, but others such as a multilayer inflation method and a coextrusion molding method can also be utilized, depending on the material to be used.

Commonly known adhesives are usable as adhesives employed during lamination of layers. Examples thereof include polyolefin based thermoplastic resin thermal dissolution adhesives such as various polyethylene resins and various polypropylene resins; thermoplastic resin heat-melt adhesives such as ethylene copolymer resins (ethylene-propylene copolymer resin, ethylene-vinyl acetate copolymer resin and ethelene-ethylacrylate copolymer resin), an ethylene-acrylic acid copolymer resin, an ionomer resin and other heat-melt type rubber based adhesives. Typical examples of emulsion type adhesives as an adhesive in the form of latex include emulsions of polyvinyl acetate resin, vinyl acetate-ethylene copolymer resin, vinyl acetate-ester acrylate copolymer resin, vinyl acetate-ester maleate copolymer resin, acrylic acid copolymer or ethylene-acrylic acid copolymer. Typical examples of latex type adhesives include rubber latex such as natural rubber, styrene butadiene rubber (SBR), acrylonitrile butadiene rubber (NBR) or chloroprene rubber. Further, examples of dry-lamination type adhesives include an isocyanate based adhesive, an urethane based adhesive and a polyester based adhesive, and examples of other usable adhesives include commonly known adhesives such as a melt lamination adhesive (in which paraffin wax, microcrystalline wax, an ethylene-vinyl acetate copolymer resin, an ethylene-ethylacrylate copolymer resin and so forth are blended), a pressure-sensitive adhesive and a thermosensitive adhesive. Specific examples of extrusion lamination type polyolefin based resin adhesives include polymer resins made of polyolefin resins such as various polyethylene resins, polypropylene resins, polybutylene resins; ethylene copolymer (EVA, EEA and so forth) resins; and others such as an ethylene-other monomer (α-olefin) copolymer like an L-LDPE resin; ionomer resins (ionic copolymer resins) like SURLYN (produced by DuPont) and HIMILAN (produced by Mitsui Polychemicals Co., Ltd; and ADMER (adhesion polymer, produced by Mitsui Petroleum Chemical Industries, Ltd.). Another type of adhesive such as a UV curable adhesive has recently been employed. Specifically, an LDPE resin and an L-LDPE resin are preferable since they are suitable for lamination at low cost. Particularly, a mixture resin in which the drawback of each resin is covered by blending at least two kinds of the above-described resins is also preferable. For example, a laminating speed is increased and pinholes are reduced since a spreading property is improved and "neck-in" becomes smaller by blending an LDPE resin and an L-LDPE resin.

EXAMPLE

Next, the present invention is described in detain employing examples, but the present invention is not limited thereto.

Example 1

(Preparation of Scintillator Plate)

(Preparation of Substrate)

A 0.125 mm thick polyimide film (90 mm×90 mm) subjected to a plasma treatment in Ar gas and a 0.5 mm thick aluminum substrate were prepared.

(Formation of Phosphor Layer)

Employing an evaporator in FIG. 4, phosphor (CsI: 0.003Tl) was evaporated onto a substrate to form a phosphor layer, and to produce a scintillator.

Phosphor raw material (CsI:0.003Tl) was charged into a resistance heating crucible, and an aluminum plate was set to a substrate holder to adjust the distance between the crucible and the substrate. Successively, after the interior of an evaporator was once evacuated to adjust a vacuum degree to 0.5 Pa by introducing Ar gas, the substrate temperature was maintained at 150° C. while rotating the substrate at a speed of 10 rpm. Next, the phosphor was evaporated by heating the crucible, and evaporation was terminated when the thickness of the phosphor layer reached 160 μm.

(Preparation of Protective Film)

As shown in Table 1, polypropylene films (PP) having a thickness of 30 μm and varied surface roughness were prepared as the protective film provided on the side of a phosphor layer surface, and were designated as No. 1-1-No. 1-5. Incidentally, in order to adjust the surface roughness, utilized PP was appropriately selected from commercially available PP. In addition, both sides of the utilized PP film have the same surface roughness. As comparative protective films, an adhesive (VYLON 300, produced by Toyobo Co., Ltd.) was coated on the one surface or the both surfaces of protective film No. 1-3, and dried to obtain adhesion layers having a thickness of 3 μm, and roughened surfaces of selected PP films were also removed to prepare films having adhesive surfaces, which were designated as No. 1-6-No. 1-8.

The protective film provided on the substrate side of a scintillator sheet is the same as one utilized on the phosphor surface side.

Surface roughness Ra was measured employing Surfcom 1400D manufactured by Tokyo Seimitsu Co., Ltd. The average thickness was determined from measured data, employing a stylus type thickness tester (PG-01, manufactured by Teclock Co., Ltd.).

TABLE 1

| Protective Film No. | Surface roughness Ra on the phosphor surface side (μm) | Surface roughness Ra on the light-receiving element (μm) |
|---|---|---|
| 1-1 | 0.03 | 0.03 |
| 1-2 | 0.05 | 0.05 |
| 1-3 | 0.28 | 0.28 |
| 1-4 | 0.80 | 0.80 |
| 1-5 | 0.98 | 0.98 |
| 1-6 | 0.28 | Adhesive coated |
| 1-7 | Adhesive coated | 0.28 |
| 1-8 | Adhesive coated | Adhesive coated |

(Preparation of Scintillator Panel)

Employing the resulting protective films No. 1-1-1-8, the prepared scintillator sheets were sealed in the form shown in FIG. 1(c) to prepare scintillator panels designated as sample Nos. 101A-108A.

Sample Nos. 101A-108A each were thermally fused at the reduced pressure conditions of 1 Pa, 5 Pa, 1000 Pa, 8000 Pa and 9000 Pa in such a way that a distance from the fused portion to the peripheral portion of a scintillator sheet was adjusted to be 1 mm. An impulse sealer having a width of 3 mm was employed for thermal fusion.

Evaluation

After each of the resulting samples 101A-108A was set to a CMOS flat panel (X-ray CMOS camera system Shad-o-Box 4 KEV, produced by Rad-icon Imaging Corp.) having a square, 10 cm on a side, and sealed, sharpness was measured with 12 bit output data via the following method, the results obtained via the following evaluation criteria were shown in Table 2.

In addition, a carbon plate for a radiation-entrance window and a sponge sheet on the radiation-entrance side of a scintillator panel are placed to secure both of them by slightly pressing the light-receiving element plane and the scintillator panel.

Evaluation Method of Sharpness

X-ray of a tube voltage of 80 kVp was irradiated from the back surface of each sample (the surface on which no phosphor layer was formed) through a MTF chart made of lead, and image data were detected with the CMOS flat panel to record the data on a hard disk. The recorded data on the hard disk was subsequently analyzed by a computer to calculate Modulation Transfer Function MTF (MTF value at a space frequency of 1 cycle/mm) specified as an indicator of sharpness. In Table 2, the higher MTF value, the higher sharpness is.

Evaluation Criteria of Sharpness

A: MTF value at a space frequency of 1 cycle/mm is at least 0.9.

B: MTF value at a space frequency of 1 cycle/mm is at least 0.7 and less than 0.9.

C: MTF value at a space frequency of 1 cycle/mm is at least 0.6 and less than 0.7.

D: MTF value at a space frequency of 1 cycle/mm is less than 0.6.

TABLE 2

| Sample No. | Protective film No. | Substrate | Scintillator panel total thickness (μm) | MTF 1 Pa | 5 Pa | 1000 Pa | 8000 Pa | 9000 Pa | Remarks |
|---|---|---|---|---|---|---|---|---|---|
| 101A | 1-1 | Al | 720 | C | B | B | B | C | Inv. |
| 102P | 1-2 | PI | 345 | B | A | A | A | B | Inv. |
| 102A | 1-2 | Al | 720 | C | B | B | B | C | Inv. |
| 103P | 1-3 | PI | 345 | B | A | A | A | B | Inv. |
| 103A | 1-3 | Al | 720 | C | B | B | B | C | Inv. |
| 104P | 1-4 | PI | 345 | B | A | A | A | B | Inv. |
| 104A | 1-4 | Al | 720 | C | B | B | B | C | Inv. |
| 105P | 1-5 | PI | 345 | C | B | B | B | C | Inv. |
| 105A | 1-5 | Al | 720 | C | B | B | B | C | Inv. |
| 106P | 1-6 | PI | 345 | D | C | C | C | D | Comp. |
| 106A | 1-6 | Al | 720 | D | D | D | D | D | Comp. |
| 107P | 1-7 | PI | 345 | D | C | C | C | D | Comp. |
| 107A | 1-7 | Al | 720 | D | D | D | D | D | Comp. |
| 108P | 1-8 | PI | 345 | D | D | D | D | D | Comp. |
| 108A | 1-8 | Al | 720 | D | D | D | D | D | Comp. |

Inv.: Present invention, Comp.: Comparative example
PI: Polyimide film having a thickness of 0.125 mm
Al: Aluminum substrate having a thickness of 0.5 mm Effects of the present invention were confirmed.

Example 2

(Preparation of Scintillator Sheet)

(Preparation of Substrate)

Each of samples in Table 3 were prepared, similarly to preparation of Example 1, except that polyimide films having the substrate thickness shown in Table 3 were utilized.

(Preparation of Phosphor)

Evaporation was conducted similarly to Example 1, employing an evaporator as shown in FIG. 4.

(Preparation of Protective Film)

A plurality of PP films as protective film 1-3 in Table 1 provided on the phosphor surface side were dry laminated to make protective film thicknesses of 123 μm, 164 μm and 216 μm. Surface roughness after dry lamination was the same value as that of protective film 1-3 in Table 1. In addition, both sides of the utilized PP film have the same surface roughness. The protective film provided on the substrate side of a scintillator sheet is the same as one utilized on the phosphor surface side.

(Preparation of Scintillator Panel)

Employing the resulting protective films, the prepared scintillator sheets were sealed in the form shown in FIG. 1(c) to prepare scintillator panels, designated as sample Nos. 201-211, in the same method and condition as in Example 1.

Evaluation

Sharpness of each of the resulting sample Nos. 201-211 was measured in the same condition as in Example 1. Results obtained with the same evaluation criteria as in Example 1 are shown in Table 3.

TABLE 3

| Sample No. | Substrate thickness (μm) | Protective Film thickness (μm) | Scintillator panel total thickness (μm) | MTF | Remarks |
|---|---|---|---|---|---|
| 201 | 25 | 30 | 245 | B | Inv. |
| 202 | 50 | 30 | 270 | A | Inv. |
| 203 | 75 | 30 | 295 | A | Inv. |
| 204 | 125 | 30 | 345 | A | Inv. |
| 205 | 500 | 30 | 720 | B | Inv. |
| 206 | 1000 | 30 | 1220 | B | Inv. |
| 207 | 125 | 123 | 531 | A | Inv. |
| 208 | 125 | 164 | 613 | A | Inv. |
| 209 | 125 | 216 | 717 | B | Inv. |
| 210 | 500 | 164 | 988 | A | Inv. |
| 211 | 500 | 216 | 1092 | B | Inv. |

Inv.: Present invention

As is clear from this table, it is to be understood that effectiveness of the present invention has been confirmed.

EFFECT OF THE INVENTION

It is possible not only to provide a radiation flat panel detector in which degradation of a phosphor layer property during aging is inhibited, the phosphor layer is protected from chemical alteration and physical impact, and sharpness is excellent, but also to safely utilize it with high reliability.

What is claimed is:

1. A flat panel detector comprising a light-receiving element and provided thereon, a scintillator panel comprising a scintillator sheet having a phosphor layer provided on a substrate and provided thereon, a first protective film placed on the phosphor layer side and a second protective film placed on the substrate side to seal the scintillator sheet, wherein the light-receiving element is provided on the first protective film side of the scintillator panel, and the scintillator sheet is sealed with the first protective film and the second protective film at 5-8000 Pa, and wherein a surface of the first protective film brought into partial contact with the phosphor layer has a surface roughness Ra of 0.05-0.8 μm, and another surface of the first protective film brought into partial contact with a light receiving element plane has a surface roughness Ra of 0.05-0.8 μm, and air space portions each having a smaller refractive index than that of the first protective film, together with the partial contact, are provided between the first protective film and the phosphor layer, as well as between the first protective film and the light-receiving element plane.

2. The flat panel detector of claim 1,
wherein the first protective film and the second protective film have a thickness of 12-200 μm.

3. The flat panel detector of claim 1,
wherein the substrate has a thickness of 50-500 μm, and is formed from a polymer film exhibiting flexibility.

4. The flat panel detector of claim 3,
wherein the polymer film is a polyimide (Pl) film or a polyethylene naphthalate (PEN) film.

5. The flat panel detector of claim 1,
wherein the scintillator panel has a total thickness of at most 1 mm.

6. The flat panel detector of claim 1,
wherein the phosphor layer is a cesium iodide (CsI) layer.

* * * * *